Patented Apr. 10, 1945

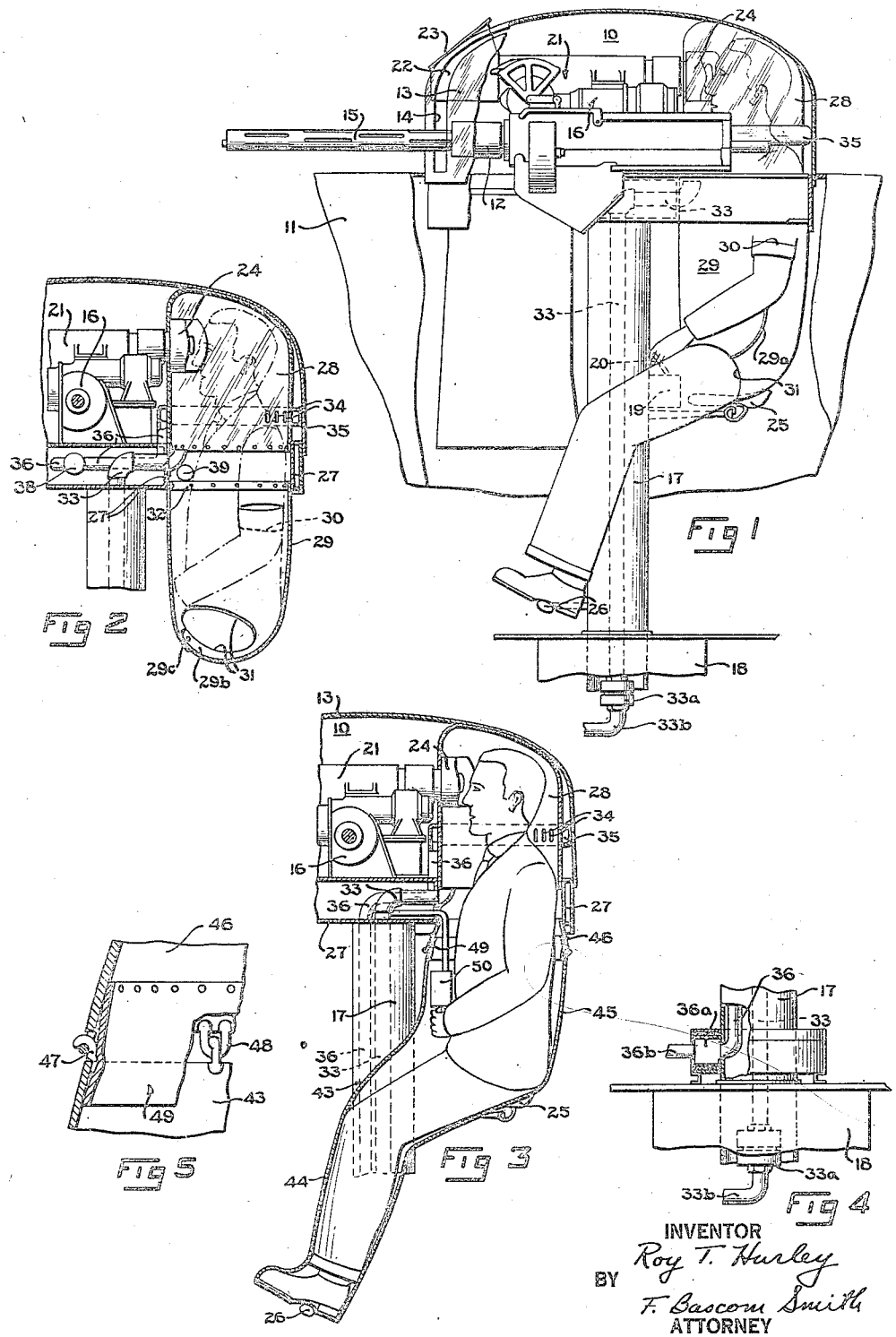

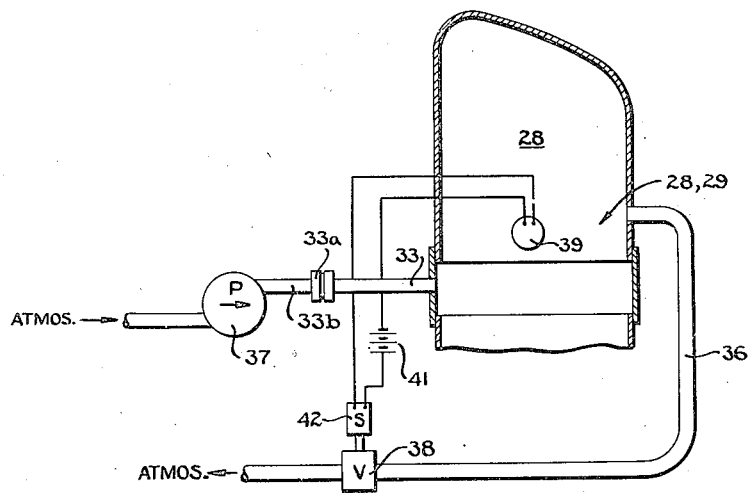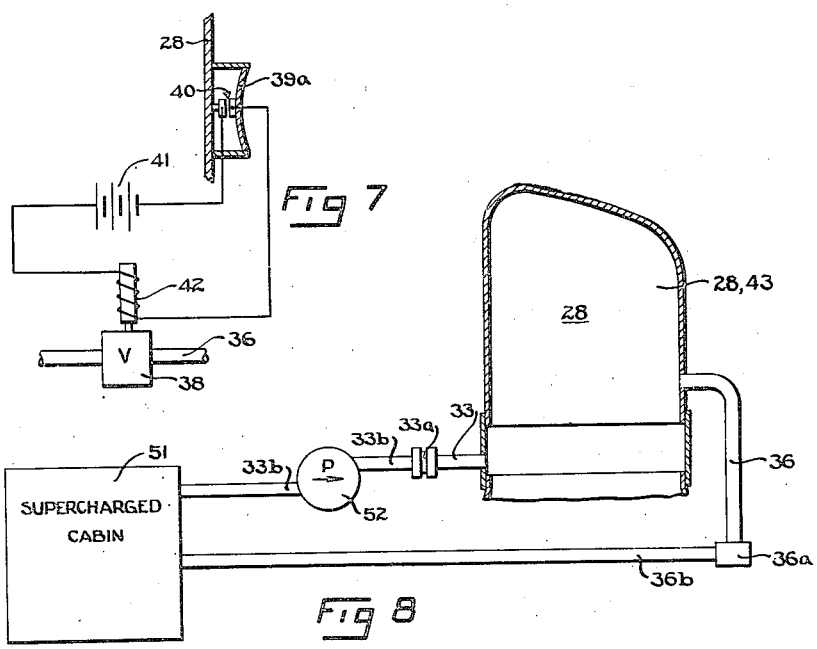

2,373,185

UNITED STATES PATENT OFFICE 2,373,185

SUPERCHARGED CHAMBER FOR AIRCRAFT

Roy T. Hurley, Westport, Conn., assignor to Bendix Aviation Corporation, South Bend, Ind., a corporation of Delaware Application October 6, 1941, Serial No. 413,795

15 Claims. (Cl. 89—37.5)

This invention relates to apparatus for aircraft and more particularly to supercharged chambers for aircraft operating at high altitudes.

In military aircraft operating at high altitudes members of the crew stationed at points remote from the cabin, for example, in the gun turrets, are exposed to highly rarefied atmospheres and intense cold. To facilitate respiration at high altitudes it has been proposed to feed the men oxygen by means of masks. This, however, has offered inadequate protection since it makes no compensation for the physical effects due to differences in pressure between the body interior and exterior. The normal functionings of the respiratory and circulatory systems of the body are seriously affected by the existence of differences in pressure between the interior and exterior of the body. Under such conditions the mind becomes dull and unresponsive. Moreover, a mask prevents the gunner from sighting properly through the sight mechanism, and the heavily insulated clothing necessary to protect the gunner from the cold hinders his movements.

Accordingly, it is an object of the present invention to provide a novel apparatus in an aircraft for heating and supercharging at high altitudes the atmosphere surrounding a member of the aircraft crew stationed, for example, in a gun turret.

Another object is to provide a novel apparatus of the above character in combination with a gun turret of the revolving type without modifying or otherwise affecting the operation of the turret.

A further object is to provide a novel apparatus comprising a substantially air-tight chamber for accommodating a single member of the crew stationed in the aircraft at a point remote from the aircraft cabin and novel means for circulating air through said chamber, said air being supercharged at altitudes exceeding a predetermined altitude.

Still another object is to provide novel means for maintaining a predetermined pressure in a closed chamber of an aircraft at varying altitudes while circulating air therethrough.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a view partly in side elevation and partly in section, with parts broken away, of an aircraft gun turret embodying a form of the present invention;

Fig. 2 is a transverse sectional view of the supercharged container of Fig. 1, the gunner being shown in phantom;

Fig. 3 is a view similar to Fig. 2 of another embodiment of the present invention, showing the gunner in full lines;

Fig. 4 is a fragmentary view of the lower end of the turret mechanism of Fig. 3 showing the intake and exhaust couplings;

Fig. 5 is a fragmentary sectional view of a form of apparatus suitable for attaching the parts of the supercharged container of Fig. 3 to each other;

Fig. 6 is a diagrammatic view of one embodiment of means for maintaining a supercharged atmosphere in the chamber for the gunner and for circulating air therethrough;

Fig. 7 is a diagrammatic view of a control mechanism for the above means; and

Fig. 8 is a diagrammatic view of another circuit for maintaining a supercharged pressure in the turret containers.

The invention is illustrated, by way of example, in Figs. 1 and 2 as embodied in a gun turret 10 carried in the fuselage 11 of an aircraft, said turret being of the type mounting a pair of laterally-spaced machine guns 12 disposed parallel to each other. Turret 10 comprises a transparent housing 13 having a pair of slots 14 therein for barrels 15 of the machine guns, said slots permitting the guns to be pivoted through an angle greater than 90° relative to said turret. To move the guns in elevation, power means 16 are provided, and to move the guns in azimuth turret 10 is mounted for rotation relative to fuselage 11, the rotation being accomplished by a power driven shaft 17 which serves to mount said turret. Shaft 17 is preferably driven by motor means 18 located at the base thereof. Suitable means for manually controlling the operation of power means 16 and 18 are provided and, as shown in Fig. 1, comprise a control box 19 carrying a movable control element 20, the latter being connected electrically or mechanically to said power means and having a trigger control for guns 12.

A sighting mechanism 21 is rigidly mounted between guns 12 and an objective lens system is carried in the forward portion 22 thereof, the latter having an angularly disposed window 23 mounted on the exterior thereof and a pivotable prism or other suitable movable reflecting means mounted on the interior thereof. The reflecting means is connected to machine guns 12 and is so arranged that movement of the guns in elevation produces a corresponding movement of the reflector so that the axis of the field of vision of the sighting mechanism 21 is directed along a line parallel to the bore of said guns. Accordingly, the target covered by guns 12 is always within the field of vision of sighting mechanism 21. A suitable eyepiece 24 is mounted on the inside end of the sighting mechanism and is provided with a yieldably face-engaging portion for facilitating sighting.

A seat 25 secured to shaft 17 is provided for the gunner who straddles the shaft with control box 19 disposed between his thighs, a support 26 being preferably secured to extend on both sides of said shaft in front thereof for supporting the gunner's feet. The head and shoulders of the gunner extend into turret 10 between guns 12 through a recess in the bottom of the turret framed by a member 27 (Fig. 2). The latter constitutes a part of the supporting structure for the apparatus mounted in the turret and has solid walls surrounding the recess for the observer's body.

To supercharge and, if desired, to heat the atmosphere surrounding at least the head, chest, abdomen and back of the gunner, a novel container is provided in turret 10 and, as shown, comprises a transparent enclosure member 28 which extends upwardly into turret housing 13, being mounted on frame 27 in air-tight engagement with the walls thereof. Eyepiece 24 of the sighting mechanism extends within said enclosure member which is adapted to receive the head and shoulders of the observer stationed in the turret. A novel garment-like member 29 of flexible, impervious material constitutes the lower portion of the container and is provided with a pair of sleeves 30 for receiving the observer's arms, and a pair of leg openings 31 through which the legs of the observer extend. Sleeves 30 and the sides of openings 31 are preferably elastic, or are lined with felt so as to be in substantially air-tight engagement with the arms and thighs, respectively, of the wearer. The upper end of member 29 is secured to the walls of frame 27 by suitable means, as, for example, a band of metal 32 riveted or screwed to the frame.

To permit the gunner to enter container 28, 29, portions of member 29 are detachably secured along a seam extending from leg opening 31 up the side of said member and down sleeve 30 to the openings therein, the edges of said seam being provided with fastening means 29a, for example, of the "zipper" type. It is also preferable to provide a seam in crotch portion 29b of member 29 and suitable means, such as clips 29c, for detachably securing the separable portions of said crotch portion to each other.

To maintain a continuous flow of air through container 28, 29, an inlet conduit 33 is connected to the interior thereof, said conduit, as shown, extending centrally through shaft 17 and sideways through the wall of frame 27 and having an upwardly turned end so as to direct the flow of entering air toward the nostrils of the gunner. A plurality of exhaust ports or slots 34 (Fig. 2) are preferably provided in the rear wall of member 28, said ports being located so as to be above the portion of the rear wall of said member adapted to be engaged by the observer's back. A manifold 35 connects ports 34 to an exhaust conduit 36 and the circulation through said conduit and inlet conduit 33 is suitably controlled to maintain a supercharged pressure in said chamber at high altitudes and to produce a sufficient circulation for proper respiration at all times. To control the pressure in chamber 28, 29, a pump or supercharger 37 (Fig. 6) is connected to discharge into inlet conduit 33 and has the intake thereof communicating with the atmosphere, said pump being of the type adapted to discharge air at a constant pressure which exceeds slightly the minimum pressure desired in chamber 28, 29 at high altitudes. However, when the pump intake pressure is greater than the pressure for which the discharge is set, as, for example, at very low altitudes, the discharge pressure is substantially equal to the intake pressure. It is preferable to locate pump 37 on the exterior of the turret and, accordingly, inlet conduit 33 which rotates with the turret is connected by means of a central coupling 33a to a stationary conduit 33b from said pump (Fig. 1). Coupling 33a may be any suitable rotatable pressure joint commercially available for connecting a rotating conduit to a stationary conduit when said conduits are coaxial with the axis of rotation at the point of connection.

To attain a sufficient circulation of air through container 28, 29 while maintaining the desired minimum pressure in said container, a valve 38 is connected to exhaust passage 36 and is controlled by means responsive to the pressure in said container. It is preferable to exhaust the air directly from the turret, and accordingly valve 38 is mounted in the turret and the passage 36 directs the air discharge passing through said valve to the turret exterior (Fig. 2). As shown diagrammatically in Figs. 6 and 7, the control means for valve 38 comprise a pressure responsive device 39, for example, of the aneroid type, mounted on the internal wall of member 28. Diaphragm 39a (Fig. 7) of said device carries one contact of a switch 40, the latter being closed by the movement of said diaphragm in response to a given pressure in chamber 28, 29. Switch 40 is in circuit with a source of energy 41 and a solenoid 42, the latter being operatively connected to valve 38. Pressures in excess of a predetermined value displace diaphragm 39a sufficiently to close switch 40 and the latter completes the circuit whereby solenoid 42 is actuated to open valve 38. It is to be understood that a pressure responsive device of the type having a mechanical connection between the member movable in response to pressure in chamber 28, 29 and the valve may be used, and that said device may have the pressure responsive means connected to conduit 36.

The gunner takes his position in turret 10 with his head and shoulders in member 28 and with his right arm in right sleeve 30, as illustrated in Figs. 1 and 2. Thereafter, he secures the detached parts of crotch portion 29b to each other by clips 29c and closes fastener 29a, rendering container 28, 29 substantially air-tight. Fastener 29a is not closed until pump 37 has begun to function and to produce a flow of air through conduit 33. It is preferable that the discharge valves of said pump be set to discharge at a pressure slightly greater than the pressure existing at 10,000 feet of altitude and, accordingly, at altitudes below 10,000 feet said pump discharges air at a pressure equal to the intake pressure. The pressure responsive control for valve 38 is regulated so as to open said valve when a pressure exceeding that at 10,000 feet of altitude is attained in chamber 28, 29. As a result, at all altitudes air is continuously circulated through said chamber since pump 37 introduces air into said chamber at a pressure exceeding the pressure necessary to open said valve. Moreover, the pressure in said chamber is equal to that surrounding the aircraft up to an altitude of 10,000 feet and thereafter the pressure is maintained substantially constant and equal to the pressure at 10,000 feet.

In the above-described embodiment, the arms and legs of the gunner remain exposed to the rarified and cold air and, accordingly, said embodiment of the invention is suitable for use when altitudes of approximately 25,000 feet are not to be exceeded. Atmospheric conditions at altitudes in excess of 25,000 feet make it desirable to enclose the entire body of the gunner in a supercharged atmosphere and a novel apparatus (Figs. 3 to 5) is provided for this purpose. The apparatus is mounted, by way of example, in a gun turret similar to that shown in Figs. 1 and 2 and comprises an upper enclosure like that of container 28, 29 of the first described embodiment. Accordingly, parts which are alike in the two structures are designated by like numerals.

In order to enclose the arms and legs of the gunner, a novel chamber is provided and, as shown, the lower part thereof comprises a trouser-like garment 43 of impervious material having a pair of boot-like leg receiving portions 44. The upper portion 45 of said garment extends to the chest of the wearer and is sufficiently voluminous to permit substantially free movement of the gunner's arms therein.

Garment 43 is attached to frame 27 by suitable means adapted to render the connection air-tight, and said means comprise a rigid skirt 46 (Figs. 3 and 5) which is secured to said frame and extends downwardly therefrom. A suitable fastener is provided for securing the lower edge of said skirt to the upper edge of garment 43 and said fastener is illustrated, by way of example, as comprising a plurality of hooks 47 attached to garment 43 and eyelets 48 secured to skirt 46 for receiving said hooks. A resilient flap 49 is secured at the upper edge thereof to the inner wall of the lower portion of skirt 46 so as to extend downwardly therefrom and overlap the upper edge of garment 43. Accordingly, when pressures in chamber 28, 43 exceed the pressures on the exterior thereof, flap 49 is pressed into air-tight engagement with skirt 46 and garment 43 and prevents air leakage between the separated edges of said skirt and garment. The mechanism for controlling the operation of the gun and turret power means and the firing of the guns comprises a control box 50 mounted so as to extend within chamber 43, 28 when garment 43 is operatively secured to skirt 46. The control box is thus readily accessible for operation by the gunner.

To circulate air through chamber 43, 28, conduits 33 and 36 may be connected to the pump and valve means of Fig. 6 for operation in the same manner as in the embodiment of Fig. 1. It is also satisfactory to connect conduits 33 and 36 to the pilot's supercharged cabin 51 (Fig. 8) and to provide a pump 52 in conduit 33b for maintaining a flow of air from said cabin to chamber 43, 28. The air is preferably returned through conduit 36 which extends through shaft 17 and is connected by an annular coupling 36a (Fig. 4) to a stationary conduit 36b which, in turn, communicates with the supercharged cabin. However, a valve controlled passage similar to that shown in Fig. 6 may be utilized for exhausting the air from chamber 43, 28 to the atmosphere surrounding the aircraft.

The gunner is enclosed in chamber 43, 28 by donning garment 43 and attaching the upper end thereof to skirt 46. Air is circulated by pump 52 through conduits 33 and 36 and a pressure corresponding to that in the supercharged pilot's cabin is maintained in chamber 43, 28.

There is thus provided a novel apparatus for surrounding the gunner in an aircraft turret with a supercharged and, if desired, a heated atmosphere at high altitudes. The apparatus comprises novel means constituting a substantially air-tight chamber for receiving the gunner, and novel means for maintaining a substantially constant supercharged pressure in said chamber at altitudes exceeding the predermined altitude, for example, 10,000 feet. Furthermore, the supercharging mechanism is positive in operation and the gunner can be readily enclosed in the chamber supercharged by said mechanism.

Although several embodiments of the present invention have been illustrated and described, it is to be expressly understood that the same is not limited thereto. For example, it will now be apparent to those skilled in the art that chamber 28, 29 of Figs. 1 and 2 may be connected to the supercharged pilot's cabin by the circuit of Fig. 8. Various other changes may be made in the design and arrangement of parts without departing from the spirit and scope of the invention. For a definition of the invention, reference will be had primarily to the appended claims.

What is claimed is:

1. In combination with a gun turret having a sighting mechanism and a transparent housing, a transparent enclosure member mounted in said housing, the eyepiece of said sighting mechanism being contained in said enclosure member, a frame member supporting said enclosure member, a garment-like member secured to said frame member, said members constituting a chamber for the gunner in said turret, means for pumping air into said chamber, valve means controlling the air discharge from said chamber, and means responsive to pressures in said chamber for actuating said valve means.

2. In combination with a gun turret having a sighting mechanism and a transparent housing, a transparent enclosure member mounted in said housing, the eyepiece end of said sighting mechanism being contained in said enclosure member, a frame member supporting said enclosure member, a garment-like member secured to said frame member, said members constituting a chamber for the gunner in said turret, and means for circulating air through said chamber at a pressure in excess of the pressure surrounding said turret.

3. In an aircraft having a supercharged cabin and a gun turret remote from said cabin, a relatively air-tight chamber for the gunner secured to and movable with said turret, and means for circulating air from said cabin through said chamber.

4. In an aircraft having a gun turret, means forming a chamber mounted on and carried by said turret for receiving at least a portion of the body of the gunner, and means for supercharging said chamber.

5. In an aircraft, a container comprising a rigid transparent housing member and a garment-like flexible member operatively secured together, said container being mounted on the aircraft for rotation relative thereto and adapted to house a member of the aircraft crew in an atmosphere under pressure greater than the pressure outside said container, and means for supercharging said container.

6. In an aircraft having a gun turret, means secured to said turret for forming a chamber around at least the head and chest portions of the body of the gunner, said chamber being adapted to be supercharged.

7. In an apparatus of the class described, a gun turret, means comprising a chamber in said turret, said means including a rigid member having a transparent upper portion for receiving the head and shoulders of a gunner, and a flexible member detachably secured to said rigid member, said flexible member having boot-like, leg-receiving portions, means for controlling the operation of said turret and the guns in said turret, said control means being contained in said chamber to be accessible to the gunner for manual actuation, and means for circulating air through said chamber at a pressure in excess of the pressure surrounding said turret.

8. In an aircraft, a container for receiving one of the crew of said aircraft, a turret, said container mounted on and carried by said turret comprising a rigid transparent upper portion and a flexible garment-like lower portion, means for pumping a breathing medium into said container, valve means controlling the exhaust from said container, and means responsive to pressure in excess of a given pressure in said container for actuating said valve means.

9. In apparatus of the class described, a turret, means comprising a chamber mounted on and carried by said turret, said means including a rigid member having a transparent upper portion for receiving the head and shoulders of a person, and a flexible garment-like member secured to said rigid member, and means for circulating a breathing medium through said chamber at high altitudes at a pressure exceeding the pressure surrounding said turret.

10. The combination with a movable gun mount of enclosure means forming a chamber for housing at least a portion of the body of the gunner, said means including a rigid transparent hood for surrounding the head of the gunner, said hood being secured to said mount, and means for circulating a breathing medium through said chamber.

11. The combination with a movable gun mount of enclosure means for at least a portion of the body of a gunner, said means including rigid means fixedly secured on said mount for enclosing at least the head of the gunner and flexible garment-like means secured to said mount, and means for circulating a breathing medium through the chamber formed by said enclosure means under pressure greater than the pressure surrounding said enclosure means.

12. The combination with a movable gun mount having a gun thereon of enclosure means forming a chamber around at least a portion of the body of a gunner, said means including transparent means secured to said mount for enclosing the head of the gunner and flexible garment-like means secured to said mount for enclosing another portion of the body of said gunner, and means for circulating a breathing medium through said chamber at a pressure exceeding the pressure surrounding said enclosure means.

13. The combination with a movable gun mount of enclosure means forming a chamber for the body of a gunner, said means including rigid means fixedly mounted on said mount for receiving the head of the gunner, at least a portion of said rigid means being transparent, and flexible garment-like means surrounding the lower portion of the gunner's body and removably secured to said mount, and means for circulating a breathing medium through said chamber at a pressure in excess of the pressure surrounding said enclosure means.

14. The combination with a movable gun mount having a gun and sighting mechanism mounted thereon of enclosure means forming a chamber for at least a portion of the body of a gunner and the eye-piece of said sighting mechanism, said closure means including rigid means fixed on said mount for surrounding said eye-piece and the head of the gunner and flexible garment-like means operatively secured to said mount for enclosing at least a portion of the body of the gunner, means for closely securing said garment-like means around the body of the gunner, and means for circulating a breathing medium through said chamber at a pressure and rate adapted to provide a comfortable existence for said gunner.

15. The combination with a movable gun mount having a gun and sighting mechanism mounted thereon and means for controlling the movements of said gun relative to said mount of closure means forming a chamber for at least a portion of the body of a gunner, said closure means including rigid means secured to said mount for enclosing the eye-piece of said sighting mechanism and the head of the gunner and flexible garment-like means secured to said mount for enclosing at least a portion of the body of the gunner and the control means for said gun, and means for circulating a breathing medium through said chamber at a temperature and pressure conducive to comfort for said gunner.

ROY T. HURLEY.